(12) United States Patent
Mahr et al.

(10) Patent No.: US 6,506,444 B1
(45) Date of Patent: Jan. 14, 2003

(54) RELEASE AGENTS FOR BITUMINOUS SUBSTANCES

(75) Inventors: Günter Mahr, Burghausen (DE); Tadahiro Okabe, Ina-machi (JP); Kengo Ito, Kashiwa (JP)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/639,482

(22) Filed: Aug. 15, 2000

(30) Foreign Application Priority Data

Aug. 19, 1999 (DE) ......................................... 199 39 257
Sep. 10, 1999 (DE) ......................................... 199 47 442

(51) Int. Cl.⁷ ............................. B05D 5/00; E01C 5/12; B32B 33/00; B32B 9/00
(52) U.S. Cl. ...................... 427/138; 428/41.8; 428/447; 428/448; 106/287.1
(58) Field of Search ................................. 428/447, 448, 428/41.8; 528/14, 33, 38; 536/124, 120; 556/465, 466, 482; 106/287.1; 427/138

(56) References Cited

U.S. PATENT DOCUMENTS

| | | |
|---|---|---|
| 4,078,104 A | 3/1978 | Martin |
| 5,378,787 A * | 1/1995 | Vrckovnik et al. ............ 528/14 |
| 5,494,502 A | 2/1996 | DeLong |
| 5,612,409 A * | 3/1997 | Chrobaczek et al. ........ 524/838 |
| 5,661,196 A * | 8/1997 | Mayer et al. ................ 523/122 |
| 5,831,080 A * | 11/1998 | Sejpka et al. ................ 536/124 |
| 5,894,977 A | 4/1999 | Dietz et al. |
| 6,143,812 A * | 11/2000 | Martin et al. .................. 524/43 |

FOREIGN PATENT DOCUMENTS

| | | |
|---|---|---|
| DE | DE 24 49 085 | 4/1976 |
| EP | EP 0 541 311 | 5/1993 |
| EP | 0 607 796 A1 | 7/1994 |
| EP | 0 612 759 A1 | 8/1994 |
| EP | EP 0 625 535 | 11/1994 |

OTHER PUBLICATIONS

English Derwent Abstract AN–1987–126329 [25], Corresponding to JP 62068820 A.
English Derwent Abstract AN–1994–128555 [08], Corresponding to JP 6063688 A.
English Derwent Abstract AN–1985–280986 [45], Corresponding to JP 60192628 A.
English Derwent Abstract AN–1993–269872 [34], Corresponding to JP 05186596 A.
English Abstract Corresponding to JP 62208913 A.
Derwent Abstract Corresponding to EP 0 612 759 {AN 1994–265900 }.
W. Noll, Chemie and Technologie der Silicone, 2$^{nd}$ Revised Ed., Verlag Chemie, Weinheim, 1968.
Engish Derwent Abstract AN 1976–34101X[19]correspondig to DE 24 49 085 A

* cited by examiner

Primary Examiner—Robert Dawson
Assistant Examiner—Michael J. Feely
(74) Attorney, Agent, or Firm—Brooks & Kushman

(57) ABSTRACT

The invention relates to a composition which comprises at least one polyorganosiloxane in aqueous solution or dispersion, in the absence of additional dispersants.

14 Claims, No Drawings

RELEASE AGENTS FOR BITUMINOUS SUBSTANCES

TECHNICAL FIELD

The invention relates to compositions, to a coating system comprising said compositions and to a process for producing such a coating.

BACKGROUND ART

Many bituminous compositions are in commercial use. Bitumens such as highway paving bitumens and industrial bitumens, bituminous binders, for example in the form of solutions and emulsions, and polymer-modified bitumens and asphalts, for example, natural asphalts and industrial asphalts, bitumen sheets, coal tar pitches, special-purpose coal tar pitches and formulations comprising special-purpose coal tar pitches such as highway pitches, coal tar binder pitches, coal tar impregnating pitches, prepared pitches, pitch suspensions and special-purpose coal tar pitches with minerals, are widely employed in asphalt, priming, insulating and leather coatings for use in the construction, electrical, paint, and coating industries. Since at conventional temperatures, bitumens, bituminous binders and asphalts are fairly solid and unaffected by water, they are used extensively to "asphalt" traffic areas, such as highways, lots and streets (in admixture with a large number of other materials), and roofs, and also to produce roofing felts.

The same properties which give bitumens, bituminous binders and asphalts their desired profile of properties, for example, toughness and outstanding adhesion to a great variety of different materials, cause significant problems in the course of their use in respect to their separation from surfaces with which they come into contact, such as truck beds and other transportation vessels, asphalting machines, road rollers, shovels, rakes and other tools.

These problems have intensified through the use of new kinds of asphalt compositions which are modified with organic polymers, for example, with synthetic or natural rubbers, thermoplastic elastomers, or thermoplastic resins, since these new kinds of asphalt compositions display increased adhesion to a very wide variety of surfaces.

Petroleum products such as diesel fuel, for example, have been and still are being used in the case of truck beds and other transportation vessels, asphalting machines, road rollers, shovels, rakes and other tools in order to facilitate the separation of bitumens, bituminous binders, asphalts, special-purpose coal tar pitches and formulations comprising special-purpose coal tar pitches from their surfaces. Diesel fuels in this application, however, are regarded as environmentally suspect. A further factor is that the release effect of diesel fuels subsides over time; the effectiveness may be inadequate in the case of relatively long journeys from the asphalt manufacturer to the asphalting project or, in particular, for the new kinds of asphalt compositions described above, such as silent (rubberized) asphalts, water-permeable asphalts, abrasion resistant asphalts, colored asphalts and high-viscosity asphalts. Furthermore, diesel fuel may incorporate itself into asphalt compositions, where it may lead to the formation of local soft spots and changes in color of the asphalt composition, especially as a result of subsequent migration to the surface of asphalted areas under the effect of heat and light. This is undesirable for asphalt compositions in general and especially so for colored asphalts. For these reasons, diesel fuels can no longer be recommended as asphalt release agents.

U.S. Pat. No. 4,078,104 describes asphalt release coatings comprising polydialkylsiloxanes such as polydimethylsiloxanes, which additionally contain from 0.1 to 90.0% by weight of aminofunctional silanes or siloxanes. The compositions can be applied in pure form with special spraying devices, or in solution in organic solvents, such as naphtha, for example. These compositions do have a release action but are expensive. The application of the pure composition requires special spraying devices, while application from solution in organic solvent is no longer acceptable from an environmental standpoint.

U.S. Pat. No. 5,494,502 describes the use of emulsions of animal or vegetable fatty oils, such as, for example, soybean oil, linseed oil, tung oil and olive oil, together with a surfactant with which the oil can be dispersed in water. The preferred mode of application involves foaming the release agent with a special foaming apparatus, which considerably limits ease of application. In addition, the release properties are distinctly limited. As soon as the water has evaporated from the formulation, the fatty oils soften the asphalt and cause it to stick more strongly to surfaces such as, for example, truck beds. Furthermore, emulsions are metastable systems which may become unstable, especially at high dilution, and may tend toward creaming and separation, which is a hindrance to application.

DISCLOSURE OF INVENTION

It is an object of the invention to improve the state of the art, and in particular, to provide an inexpensive, environmentally compatible release agent for bituminous substances and pitches which can be applied without the use of organic solvents and without special equipment, which is stable, and which displays outstanding (multiple) release properties with respect to hot bitumens, bituminous binders, asphalts, bitumen sheets, coal tar pitches, special-purpose coal tar pitches and formulations comprising special-purpose coal tar pitches, and, in particular, the new kinds of asphalts described above. These and other objects are achieved by the present invention. It has surprisingly been found that release agents for bituminous substances and pitches can be prepared from certain organopolysiloxanes as herein defined, and can advantageously be provided in the form of aqueous solutions.

BEST MODE FOR CARRYING OUT THE INVENTION

The invention provides a composition which comprises at least one organopolysiloxane in aqueous solution or dispersion, most preferably in the absence of additional dispersants. The organopolysiloxane may be an individual organopolysiloxane or a mixture of different organopolysiloxanes. The organopolysiloxanes carry functional groups to the extent that stable aqueous solutions, suspensions or dispersions can be obtained in the absence of additional surfactants or dispersants. The organopolysiloxanes can be linear, branched or resinous and are formed from units of the formulae $R_3SiO_{1/2}$ (M units), $R_2SiO_{2/2}$, (D units), $RSiO_{3/2}$ (T units) and $SiO_{4/2}$ (Q units). Organopolysiloxanes containing T and Q units are branched. Organopolysiloxanes which include large proportions of T and Q units are organopolysiloxane resins. In the preceding formulae, R is a saturated or unsaturated, unsubstituted or substituted $C_1$–$C_{60}$ hydrocarbon radical.

Examples of radicals R are alkyl radicals such as the methyl, ethyl, n-propyl, isopropyl, n-butyl, isobutyl, tert-butyl, n-pentyl, isopentyl, neopentyl, and tert-pentyl radicals; hexyl radicals, such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; alkenyl radicals such as the vinyl and the allyl radicals; cycloalkyl radicals such as cyclopentyl, cyclohexyl, cycloheptyl radicals and methylcyclohexyl radicals; aryl radicals, such as the phenyl and the naphthyl radicals; alkaryl radicals such as o-, m-, p-tolyl radicals, xylyl radicals and ethylphenyl radicals; and aralkyl radicals such as the benzyl radical, the alpha- and the β-phenylethyl radical. $C_1$–$C_{18}$ hydrocarbon radicals are preferred. Particular preference is given to the methyl radical.

Examples of substituted hydrocarbon radicals as radical R are halogenated hydrocarbon radicals, such as the chloromethyl, 3-chloropropyl, 3-bromopropyl, 3,3,3-trifluoropropyl and 3,3,4,4,5,5,5-heptafluoropentyl radical, and also the chlorophenyl, dichlorophenyl and trifluorotolyl radicals; mercaptoalkyl radicals such as the 2-mercaptoethyl and 3-mercaptopropyl radicals; cyanoalkyl radicals such as the 2-cyanoethyl and 3-cyanopropyl radicals; aminoalkyl radicals such as the 3-aminopropyl, N-(2-aminoethyl)-3-aminopropyl and N-(2-aminoethyl)-3-amino-(2-methyl) propyl radicals; aminoaryl radicals such as the aminophenyl radical; acyloxyalkyl radicals such as the 3-acryloxypropyl and 3-methacryloxypropyl radicals; hydroxyalkyl radicals, acetoxyalkyl radicals such as the 3-acetoxypropyl radical; diethylphosphonic ester radicals such as the ethyl diethylphosphonate radical; and succinic anhydride alkyl radicals such as the 3-(succinic anhydride)propyl radical.

All substituted hydrocarbon radicals which do not adversely affect the stability of the solution, suspension or dispersion or the release properties of the asphalt release composition can be used. The saturated or unsaturated, unsubstituted or substituted $C_1$–$C_{60}$ hydrocarbon radicals may also include heteroatoms, for example a monovalent, unsubstituted or fluoro-, chloro-, bromo-, $C_1$–$C_4$-alkoxyalkyl- or cyano-substituted $C_3$ to $C_{30}$ hydrocarbon radical which can be interrupted by radicals which are attached on either side to carbon atoms and which come from the group consisting of —O—, —COO—, —OOC—, —CONR—, —NRCO— and —CO—. Preference is given to the heteroatoms of —O—, —S— and —NH—. Further preferred radicals are $C_6$–$C_{30}$ aryl, alkaryl or aralkyl radicals. These radicals can also be substituted. Examples of such radicals are the phenyl radical and the naphthyl radical.

The organopolysiloxanes can also preferably contain hydroxyl radicals, hydrogen radicals, $C_{1-C8}$ alkoxy radicals, aminoalkyl radicals, polyoxyalkylene radicals, and polysugar radicals. Preferred alkoxy radicals are $C_{1-C4}$-alkoxy radicals. Particular preference is given to the methoxy and the ethoxy radical. Preferred polyoxyalkylene radicals are radicals which contain oxyethylene, oxypropylene and oxybutylene groups. Particularly preferred polyoxyalkylene radicals are radicals which contain oxyethylene and oxypropylene groups. Suitable polyoxyalkylene radicals are known to the person skilled in the art. All polyoxyalkylene radicals which do not adversely affect the stability of the solution, suspension or dispersion or the release properties of the asphalt release agent can be used. The preferred polysugar radical is the polyglucoside radical.

The organopolysiloxanes can also contain alkylene groups or individual, oligomeric and polymeric polyoxyalkylene groups in the organopolysiloxane chain, such that the organopolysiloxanes have groups Si—$R^1$—Si, where $R^1$ is $C_1$–$C_{18}$ alkylene radical or polyoxyalkylene radical of the formula —O—($R^2$—O)$_n$— or —($R^2$—O)$_n$—, in which $R^2$ is a $C_1$–$C_{18}$ alkylene radical, preferably a $C_2$–$C_4$ alkylene radical and, with particular preference, the ethylene or propylene radical, and n is an integer from 1 to 100.

Examples of $R^2$ are alkylene radicals such as the methylene, ethylene, propylene, butylene, pentylene, hexylene, heptylene, octylene, nonylene, decylene, undecylene, dodecylene, hexadecylene and octadecylene radicals.

Preferred organopolysiloxanes which can be used as the organopolysiloxane component are hydroxy-functional, alkoxy-functional, polyoxyalkylene-functional and polyglycoside-functional organopolysiloxanes whose non-functional groups are preferably methyl groups. Particularly preferred organopolysiloxanes are polyoxyalkylene-functional organopolysiloxanes of the formula

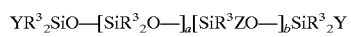

$$YR^3{}_2SiO—[SiR^3{}_2O—]_a[SiR^3ZO—]_bSiR^3{}_2Y$$

where

Y is the radical $R^3$ or the radical Z, $R^3$ is an alkyl radical of 1 to 60 carbon atoms, a substituted alkyl radical, an unsubstituted or substituted aryl radical or unsubstituted or substituted alkaryl radical, but where at least 80% of the radicals $R^3$ are methyl groups, examples of $R^3$ being the corresponding radicals described under R, Z is a radical of the formula

$$—R^4{}_c—O—(C_dH_{2d-e}R^5{}_eO—)_mR^6$$

where $R^4$ is a divalent alkylene radical which can also be branched, examples of which are described under $R^2$, c has a value of 0 or 1, d has a value from 2 to 4, e has a value from 0 to 3, m has a value from 1 to 100 and the expression surrounded by the bracket with the index m can be identical or different and can be arranged in blocks or in random distribution, $R^5$ is a monovalent organic radical which may also be branched or which may contain ether groups such as oxyethylene, oxypropylene and oxybutylene groups, and $R^6$ is a hydrogen radical, an unsubstituted or substituted alkyl radical of 1 to 6 carbon atoms, an acyl radical or a radical —O—CO—NH—$R^7$ in which $R^7$ is an unsubstituted or substituted alkyl or aryl radical, examples of $R^5$ and $R^7$ being the corresponding radicals described under R, where at least one radical Z must be present on average per molecule, optionally in the form of the radical Y, a has a value from 0 to 500 and b has a value from 0 to 100.

Preference is given to polyglycoside-functional organopolysiloxanes whose structure and preparation is described in the patent EP 0612759. Examples of polyglycoside-functional organopoly-siloxanes are organosilicon compounds which contain glycoside radicals and are composed of units of the formula

$$R^8{}_fR^9{}_gSiO_{(4-f-g)/2} \qquad (I)$$

in which
R$^9$ can be identical or different and is a radical of the formula $$W-(R^{10}O)_h-R^{11}-$$

in which
W is a glycoside radical which is composed of preferably up to 10, more preferably from 1 to 4 and, with particular preference, 1 to 2 monosaccharide units,
R$^{10}$ can be identical or different and is an alkylene radical,
h is 0 or a number from 1 to 20, preferably 0 or more preferably a number from 1 to 15, with particular preference 0 or a number from 1 to 4, and
R$^{11}$ is alkylene radical, with the proviso that the sum of f and g is less than or equal to 3 and the organosilicon compound composed of units of formula (I) includes at least one radical R$^9$ per molecule.

Radical R$^8$ preferably comprises unsubstituted or substituted hydrocarbon radicals of 1 to 18 carbon atoms, particular preference being given to alkyl radicals of 1 to 4 carbon atoms, especially the methyl radical. Examples of radicals R$^8$ are alkyl radicals such as the methyl, ethyl, n-propyl, isopropyl, n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals, for example the 2,2,4-trimethylpentyl radical, nonyl radicals such as the n-nonyl radical; decyl radicals such as the n-decyl radical; dodecyl radicals such as the n-dodecyl radical; octadecyl radicals such as the n-octadecyl radical; alkenyl radicals such as the vinyl, allyl, n-5-hexenyl, 4-vinylcyclohexyl and 3-norbornenyl radicals; cycloalkyl radicals such as cyclopentyl, cyclohexyl, 4-ethylcyclohexyl, cycloheptyl, norbornyl, and methylcyclohexyl radicals; aryl radicals such as the phenyl, biphenylyl, naphthyl, anthryl, and phenanthryl radicals; alkaryl radicals such as o-, m-, p-tolyl radicals, xylyl radicals and ethylphenyl radicals; and aralkyl radicals such as the benzyl radical, and the α- and the β-phenylethyl radicals.

Examples of monosaccharides of which the glycoside radicals W can be composed are hexoses and pentoses, such as glucose, fructose, galactose, mannose, talose, allose, altrose, idose, arabinose, xylose, lyxose and ribose, particular preference being given to glucose.

Examples of alkylene radicals are methylene, ethylene, propylene, butylene, pentylene, hexylene, heptylene, octylene, nonylene, decylene and octadecylene radicals.

Radical R$^{10}$ preferably comprises the ethylene radical and the 1,2-propylene radical, particular preference being given to the ethylene radical.

Radical R$^{11}$ preferably comprises linear alkylene radicals of 2 to 20 carbon atoms, and, with particular preference, linear alkylene radicals of 2 to 8 carbon atoms, especially the n-propylene radical.

Examples of R$^9$ are
G—CH$_2$CH$_2$CH$_2$—,
G—[CH$_2$CH$_2$O]—CH$_2$CH$_2$CH$_2$—,
G—[CH$_2$CH$_2$O]$_2$—CH$_2$CH$_2$CH$_2$—,
G—[CH$_2$CH(CH$_3$)O]—CH$_2$CH$_2$CH$_2$—,
G—[CH$_2$CH(CH$_3$)O]$_2$—CH$_2$CH$_2$CH$_2$—,
G—[CH$_2$CH$_2$O]—CH$_2$CH(CH$_3$)CH$_2$—,
G—[CH$_2$CH$_2$O]$_2$—CH$_2$CH(CH$_3$)CH$_2$—,
G being a glucoside radical (C$_6$H$_{11}$O$_6$—),
G$_2$—CH$_2$CH$_2$CH$_2$—,
G$_2$—[CH$_2$CH$_2$O]—CH$_2$CH$_2$CH$_2$—,
G$_2$—[CH$_2$CH$_2$O]$_2$—CH$_2$CH$_2$CH$_2$—,
G$_2$—[CH$_2$CH(CH$_3$)O]—CH$_2$CH$_2$CH$_2$—,
G$_2$—[CH$_2$CH(CH$_3$)O]$_2$—CH$_2$CH$_2$CH$_2$—,
G$_2$—[CH$_2$CH$_2$O]—CH$_2$CH(CH$_3$)CH$_2$— and
G$_2$—(CH$_2$CH$_2$O)$_2$—CH$_2$CH(CH$_3$)CH$_2$—,
G2 being a glycoside radical composed of two glucose units.

Preferably, radical R$^9$ comprises G—CH$_2$CH$_2$CH$_2$—, G—[CH$_2$CH$_2$O]—CH$_2$CH$_2$CH$_2$—, G$_2$—CH$_2$CH$_2$CH$_2$— and G$_2$—[CH$_2$CH$_2$O]]—CH$_2$CH$_2$CH$_2$—, particular preference being given to G—[CH$_2$CH$_2$O]—CH$_2$CH$_2$CH$_2$— and G$_2$—[CH$_2$CH$_2$O]—CH$_2$CH$_2$CH$_2$— and G being a glucoside radical (C$_6$H$_{11}$O$_6$—) and G$_2$ being a glycoside radical composed of two glucose units.

The organosilicon compounds of the invention which contain glycoside radicals are preferably those of the formula $$R^9{}_xR^8{}_{3-x}SiO-[(SiR^8R^9O)_i-(SiR^8{}_2O)_n]_y-SiR^8{}_{3-x}R^9{}_x \quad (III),$$

in which R$^8$ and R$^9$ are as defined above,
i can be identical or different and is 0 or a number from 1 to 200, preferably 0 or a number from 1 to 100 and, with particular preference, 0 or a number from 1 to 50,
n can be identical or different and is 0 or a number from 1 to 1000, preferably 0, or a number from 1 to 500, and, with particular preference, 0 or a number from 1 to 100,
x is 0 or 1, and
y is 0 or a number from 1 to 1200, preferably 0 or a number from 1 to 600 and, with particular preference, 0 or a number from 1 to 100, with the proviso that the compound of the formula (III) contains at least one radical R$^9$.

If i in the organosilicon compounds of formula (III) containing glycoside radicals is on average other than 0, x is preferably 0. If x in the organosilicon compounds of formula (III) containing glycoside radicals is on average other than 0, i is preferably 0.

Although not shown by formula (III), up to 10 mol percent of the diorganosiloxane units can be replaced by other siloxane units, such as, for example, R$^8$SiO$_{3/2}$, R$^9$SiO$_{3/2}$ and/or SiO$_{4/2}$ units, R$^8$ and R$^9$ being as defined above.

The organosilicon compounds of the invention containing glycoside radicals can be prepared by various processes, which, for example, are described in EP-A-0 612 759.

Polyoxyalkylene-functional organopolysiloxanes are known to the person skilled in the art and can be prepared by transition metal catalyzed addition of Si—H bonds onto alkenyl-containing polyethers or by acid catalyzed reaction of hydroxyl-containing polyethers with siloxanes containing SiOH, SiOR, SiH or SiN groups (W. Noll, Chemie und Technologie der Silicone, 2nd revised and substantially expanded edition, Verlag Chemie GmbH, Weinheim, 1968).

Preferred compositions are compositions which comprise polyoxyalkylene-functional or polyglucoside-functional organopolysiloxanes or mixtures thereof. Particularly preferred asphalt release agents are compositions which comprise polyoxyalkylene-functional organopolysiloxanes. Such compositions are particularly preferred on account of the fact that they provide the most economic formulation, the best (multiple) release effect and the most uniform and also most universal release properties over a broad spectrum of different applications.

The organopolysiloxanes must be water soluble or must give stable suspensions or dispersions. Preference is given to organopolysiloxanes which are water soluble or self-suspending or self-dispersing. Particular preference is given to organopolysiloxanes which are water soluble. Although water soluble or self-suspending or self-dispersing organopolysiloxanes are preferred for the preparation of the asphalt release agents of the invention, the asphalt release agents of the invention can also be prepared using emulsifiers or dispersing aids or suspending aids, although this is not preferred. Suitable emulsifiers are known to the person skilled in the art.

The organopolysiloxanes possess a viscosity of 25° C. of from 10 $mm^2s^{-1}$ to 100,000 mPas, preferably from 10 $mm^2s^{-1}$ to 50,000 mPas and, with particular preference, from 10 $mm^2s^{-1}$ to 10,000 mPas.

The compositions of the invention contain from 0.001% by weight to 99.999% by weight of organopolysiloxane component, preferably from 0.05% by weight to 70% by weight and, with particular preference, from 0.05% by weight to 35% by weight. The actual amount of organopolysiloxane component is dependent on the nature of the organopolysiloxanes, on the surface to be treated, on the tackiness of the substance to be released, and on the number of release procedures to be achieved.

A preferred composition is a composition of the invention in which at least the polyorganosiloxane or at least the polyethersiloxane or at least the polyglycosidesiloxane is present in water in a weight ratio of preferably from 1:0.001 to 1:100,000, with particular preference from 1:0.43 to 1:5000 and, in particular, from 1:1.86 to 1:5000.

In addition to the required organopolysiloxane component and water, the compositions of the invention can comprise synthetic or organic oils, resins and waxes in the form of their aqueous dispersions, where not soluble in water, bactericides, corrosion inhibitors, solubilizers, antifoams, biocides, fungicides, tackifiers, surface treatment agents, spreading and wetting agents, antifreeze agents, polyethers emulsifiers, or dispersing and suspending aids. Solubilizers, emulsifiers, dispersing aids, and suspending aids are not preferred; each of these auxiliaries can be present in amounts of from 0% by weight to 5% by weight, preferably from 0% by weight to 3% by weight and, with particular preference, from 0% by weight to 2% by weight. The polyethers include a large number of polymers which are very different in structural terms, examples being the polyalkylene glycols (polyethylene glycols, polypropylene glycols and polyepichlorohydrins) as polymers of 1,2-epoxides, epoxy resins, polytetrahydrofurans (polytetramethylene glycols), polyoxetanes, polyaryl ethers (polyphenylene ethers), alkyl polyglycosides, or polyether ketones such as polyether ether ketones.

Also used are chlorinated polyethers, polysulfones (polyether sulfones) and polyether-polyimides, and also functionalized polyethers, i.e., compounds having a polyether framework which also carry other functional groups, such as, for example, carboxyl, epoxy, allyl or amino groups, etc. Susceptible to diverse use are block copolymers of polyethers and polyamides (known as polyether amides or polyether block amides, abbreviation PEBA), it being possible for polyethers to be present preferably in amounts from 0 to 20% by weight, more preferably from 0 to 10% by weight, and, with particular preference, from 0 to 5% by weight.

Unlike the compositions of the above-described prior art which contain fatty oils as a necessary constituent, with all of the attendant disadvantages described above, the compositions of the invention can comprise small amounts of relatively inexpensive animal and vegetable oils. These small amounts of not more than 20% by weight, preferably not more than 10% by weight and, with particular preference, not more than 5% by weight do not, in their small amount, have the disadvantages of release agent compositions based solely on such oils.

The compositions of the invention are advantageous in the processing of asphalts which comprise, in particular, aggregates such as rock, coarse gravel, crushed stone, minerals and sand, which are mixed with the asphalts and laid hot or cold in the form of an asphalt mix. The asphalts can also be modified with polymers, such as, for example, synthetic or natural rubbers, such as, for example, styrene-butadiene rubbers (SBR), chloroprene rubbers (CR) and nitrile-butadiene rubbers (NBR), or with thermoplastic elastomers, such as, for example, styrene-butadiene-styrene-(SBS) copolymers and styrene-isoprene-styrene (SIS) copolymers, or with thermoplastic resins, such as, for example, ethylene-vinyl acetate (EVA) copolymers, ethylene-acrylate (EEA) copolymers and epoxy resins. The compositions can be employed in the construction of hard surfaces, such as, for example, in the case of sidewalks, highways, parking lots, cycle paths, runways, roofs and the like.

The compositions of the invention can be applied as a film on surfaces of paper, plastics, (coated) metals or other substrates which are expected to come into contact with the asphalt compositions. The compositions of the invention can be applied by any known, conventional method, such as, for example, by brushing, spraying, application with a cloth, or dipping, using known, conventional equipment which operates manually or automatically. The use of special equipment is unnecessary. Special equipment can be used, although this is not preferred.

The compositions can be provided in the form of their ready-to-apply aqueous solutions or dispersions, which can be employed without further dilution to treat the surfaces in question, in the form of their dilutable aqueous solutions or dispersions, or in concentrated form.

The pH of the compositions of the invention is from 4 to 10, preferably between 7 and 9, if these compositions are applied to iron or steel substrates. The pH can be adjusted if desired by adding mild organic bases, such as diethanolamine and triethanolamine, for example. Inorganic bases such as, for example, alkali metal hydroxides or ammonia can also be used.

The invention additionally provides a layered system comprising at least three layers, the first layer being a substrate and the second layer comprising a composition of the invention and the third layer comprising at least one bituminous substance or mixture of substances or one substance or mixture of substances containing coal tar pitch. The substrate is preferably paper, plastic, metal articles, such as truck beds, transportation vessels, rakes, shovels, equipment and machinery for asphalting, or road rollers.

A preferred layer system is one wherein the third layer directly adjoins the second layer. Between the substrate and the second layer it would also be possible for there to be at least one further layer, such as, for example, oil layers, layers which occur as a result of the work sequence, or other layers of release agent.

The invention provides, furthermore, a process for producing a coating which repels bituminous substances or mixtures of substances or substances or mixtures of substances containing coal tar pitch, where a composition of the invention is applied.

An advantage of the compositions of the invention is that they can be used as an asphalt release agents on the basis of organopolysiloxanes in the form of their aqueous solutions. The asphalt release agent compositions of the invention as are environmentally compatible; they preferably contain no organic solvents whatsoever, for example, aliphatic or aromatic hydrocarbons; they can be applied easily; they are stable even in high dilution; they exhibit outstanding (multiple) release properties with respect to hot bitumens, bituminous binders, asphalts, bitumen sheets, coal tar pitches, special-purpose coal tar pitches and formulations comprising special-purpose coal tar pitches and, in particular, with respect to the new kinds of asphalts described above; and they induce no color change in the asphalt compositions and, in particular, in colored binders and asphalts.

The asphalt release agent compositions of the invention as asphalt release agents are especially effective in particular as a release medium for hot bitumens, bituminous binders, asphalts, bitumen sheets, coal tar pitches, special-purpose coal tar pitches and formulations comprising special-purpose coal tar pitches such as, for example, distillation bitumen, high-vacuum bitumen, oxidation bitumen, hard bitumen, precipitation bitumen, highway paving bitumen, industrial bitumen, bitumen solution, flux bitumen, cold bitumen, bitumen coating material, bitumen emulsion, bitumen pressure-sensitive adhesive, polymer-modified bitumen, conventional, polymer-modified or colored natural asphalt, asphaltite and mineral asphalt, conventional, polymer-modified or colored industrial asphalt, road pitch, cold pitch solution, ageing-resistant road pitch, pitch bitumen, bitumen pitch, coal tar bonding pitch, coal tar impregnating pitch, prepared pitch, high-viscosity road pitch, pitch emulsion, polymer-modified special-purpose coal tar pitch, pitch suspension and special-purpose coal tar pitch with minerals. For the sake of simplicity, and owing to the definitions and nomenclature of the above-described bituminous substances and pitches, which is not always uniform, the use of definitions and names often being specific to individual regions, the term "asphalt compositions" is used for the bituminous substances and pitches described above. For the Federal Republic of Germany, definitions, descriptions, requirements and material characteristics of bitumens and coal tar pitches are set out in DIN 55946 Parts 1 and 2 and in DIN 1995 Parts 1 to 5. However, the invention is not limited to these.

In Examples 1a to 1c and 2a to 2n, the following test method (TM 1) was used in order to determine the release performance of the test release agents:

TM 1: A defined amount of each release agent was applied uniformly to a steel panel measuring 10×10 cm. 3.9 g of an asphalt binder liquefied at 180° C. were then poured into a hollow steel cylinder with a height of 15 mm and a diameter of 25 mm which had been mounted beforehand on the treated steel panel. After the asphalt binder had cooled to 30° C., the release force required to detach the asphalt-filled hollow cylinder from the steel panel was determined using a spring balance fastened to the hollow cylinder, the spring balance being moved at a constant speed of 1 cm/s in a direction parallel to the steel panel. The release force is reported in g/cm².

In Examples 3a and 3b, the following test method (TM 2) was used in order to determine the release performance and any possible adverse effects of the test release agents in terms of discoloration on the colored asphalt binder:

TM 2: A defined amount of each release agent was applied uniformly to a steel panel measuring 10×10 cm. 3.9 g of an asphalt binder liquefied at 180° C. were then poured into a hollow steel cylinder with a height of 15 mm and a diameter of 25 mm which had been mounted beforehand on the treated steel panel. The asphalt binder was then left at a temperature of 180° C. for 30 minutes. After the asphalt binder had cooled to 30° C., the release force required to detach the asphalt-filled hollow cylinder from the steel panel was determined using a spring balance fastened to the hollow cylinder, the spring balance being moved at a constant speed of 1 cm/s in a direction parallel to the steel panel. The release force is reported in g/cm².

In Examples 1a to 1c, 2a to 2n, 3a, 3b and 4a to 4d the following high-viscosity, polymer-modified asphalt binders were used in order to show the suitability of the asphalt release agent of the invention even under more stringent conditions:

Asphalt binder AB 1: black, polymer-modified asphalt binder of the brand Senaphalt from Nisshin Kasei, Tokyo, Japan, having the following parameters: needle penetration at 25° C. about 43¹/₁₀ mm; softening point about 87° C.; kinematic viscosity at 140° C. about 2290 mm²/s; kinematic viscosity at 180° C. about 321 mm²/s. This asphalt binder is used for high-grade water-permeable asphalts.

Asphalt binder AB 2: colored, polymer-modified asphalt binder of the brand Shule Colors from Nisshin Kasei, Tokyo, Japan, having the following parameters: needle penetration at 25° C. about 43¹/₁₀ mm; softening point about 88° C.; kinematic viscosity at 140° C. about 2530 mm²/s; kinematic viscosity at 180° C. about 570 mm²/s. This asphalt binder is used for high-grade colored water-permeable asphalts.

EXAMPLES

General Formula

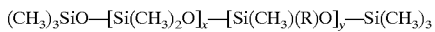

Formula A (viscosity 200 mm²/s)

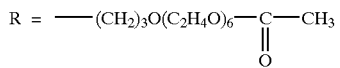

x=0; y~55.

Formula B (viscosity 800 mm²/s)

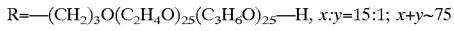

Compound C

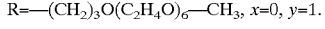

Formula D glucoside

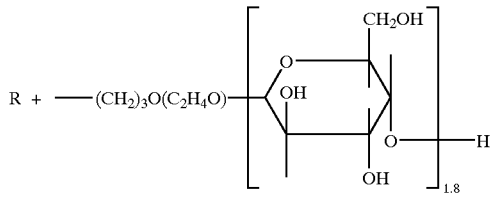

x:y=1:1; x+y~55

Example 1a

The release force of a water soluble polyether-functional organopolysiloxane of formula B (viscosity 800 mm²/s), against AB 1 was examined in accordance with TM 1. 2 g of the water soluble polyether-functional organopolysiloxane were used.

Example 1b

The release force of an asphalt release agent, comprising 20% by weight of a water soluble polyether-functional organopolysiloxane of formula B, of viscosity 800 mm$^2$/s, and 80% of water, against AB 1 was examined in accordance with TM 1. 2 g of the asphalt release agent were used.

Example 1c

The release force of a diesel fuel from Idemitsu, Japan against AB 1 was examined in accordance with TM 1. 2 g of the diesel fuel were used.

The results of Examples 1a to 1c are listed in the following table:

|  | Example 1a | Example 1b | Example 1c |
|---|---|---|---|
| Release force [g/cm$^2$] | 81–92 | 367–407 | no release |

Even in dilution, the asphalt release agents of the invention exhibit an outstanding release action with respect to high-viscosity polymer-modified asphalt binder which can be used for water permeable asphalts. Diesel fuels are unsuitable as release agents for these asphalt binders.

Example 2a

The release force of a water soluble polyether-functional organopolysiloxane of formula B, of viscosity 800 mm$^2$/s, against AB 2 was examined in accordance with TM 1. 0.5 g of the water soluble polyether-functional organopolysiloxane was used.

Example 2b

The release force of a water soluble polyether-functional organopolysiloxane of formula B, of viscosity 800 mm$^2$/s, against AB 2 was examined in accordance with TM 1. 1 g of the water soluble polyether-functional organopolysiloxane was used.

Example 2c

The release force of an asphalt release agent, comprising 50% by weight of a water soluble polyether-functional organopolysiloxane of formula B, of viscosity 800 mm$^2$/s, and 50% by weight of water, against AB 2 was examined in accordance with TM 1. 0.5 g of the asphalt release agent was used.

Example 2d

The release force of an asphalt release agent, comprising 50% by weight of a water soluble polyether-functional organopolysiloxane of formula B, of viscosity 800 mm$^2$/s, and 50% by weight of water, against AB 2 was examined in accordance with TM 1.1 g of the asphalt release agent was used.

Example 2e

The release force of an asphalt release agent, comprising 20% by weight of a water soluble polyether-functional organopolysiloxane of formula B, of viscosity 800 mm$^2$/s, and 80% by weight of water, against AB 2 was examined in accordance with TM 1. 0.5 g of the asphalt release agent was used.

Example 2f

The release force of an asphalt release agent, comprising 20% by weight of a water soluble polyether-functional organopolysiloxane of formula B, of viscosity 800 mm$^2$/s, and 80% by weight of water, against AB 2 was examined in accordance with TM 1.1 g of the asphalt release agent was used.

Example 2g

The release force of a water soluble polyether-functional organopolysiloxane of formula A, of viscosity 200 mm$^2$/s, against AB 2 was examined in accordance with TM 1. 0.5 g of the water soluble polyether-functional organopolysiloxane was used.

Example 2h

The release force of an asphalt release agent, comprising 20% by weight of a water soluble polyether-functional organopolysiloxane of formula A, of viscosity 200 mm$^2$/s, and 80% by weight of water, against AB 2 was examined in accordance with TM 1. 0.5 g of the asphalt release agent was used.

Example 2i

The release force of an asphalt release agent, comprising 50% by weight of a water soluble polyglucoside-functional organopolysiloxane of formula D, which is solid at room temperature and contains glucose units as glucoside unit, and 50% by weight of water, against AB 2 was examined in accordance with TM 1. 0.5 g of the asphalt release agent was used.

Example 2j

The release force of an asphalt release agent, comprising 10% by weight of a water soluble polyglucoside-functional organopolysiloxane of formula D, which is solid at room temperature, and 90% by weight of water, against AB 2 was examined in accordance with TM 1. 0.5 g of the asphalt release agent was used.

Example 2k

The release force of a water dispersible polyether-functional organopolysiloxane of formula C, of viscosity 20 mm$^2$/s, against AB 2 was examined in accordance with TM 1. 0.5 g of the water dispersible polyether-functional organopolysiloxane was used.

Example 2l

The release force of an asphalt release agent, comprising 20% by weight of a water dispersible polyether-functional organopolysiloxane of formula C, of viscosity 20 mm$^2$/s, and 80% by weight of water, against AB 2 was examined in accordance with TM 1. 0.5 g of the asphalt release agent was used.

Example 2m

The release force of a diesel fuel from Idemitsu, Japan, against AB 2 was examined in accordance with TM 1. 0.5 g of the diesel fuel was used.

Example 2n

The release force of a diesel fuel from Idemitsu, Japan, against AB 2 was examined in accordance with TM 1. 1 g of the diesel fuel was used.

The results of Examples 2a to 2n are listed in the following table:

|  | 2a | 2b | 2c | 2d | 2 | 2f | 2g |
|---|---|---|---|---|---|---|---|
| Release force [g/cm²] | 367–407 | 143–204 | 285–367 | 367–509 | 509–611 | 163–305 | 509 |

|  | 2h | 2i | 2j | 2k | 2l | 2m | 2n |
|---|---|---|---|---|---|---|---|
| Release force [g/cm²] | 293 | 118 | 161 | 310 | 141 | no release | no release |

Both in low concentration and in dilution, both water soluble and water dispersible polyether-functional organopolysiloxanes and water soluble polyglucoside-functional organopolysiloxanes exhibit an outstanding release action with respect to high-viscosity polymer-modified colored asphalt binder which can be used for water-permeable colored asphalts. Diesel fuels are unsuitable as release agents for these asphalt binders.

Example 3a

The release force of a water soluble polyether-functional organopolysiloxane of formula B, of viscosity 800 mm²/s, against AB 2 was examined in accordance with TM 2. 0.5 g of the water soluble polyether-functional organopolysiloxane was used. In addition, an assessment was made of whether the water soluble polyether-functional organopolysiloxane induces discoloration of the colored asphalt binder under the prevailing test conditions.

Example 3b

The release force of a diesel fuel from Idemitsu, Japan, against AB 2 was examined in accordance with TM 2. 0.5 g of the diesel fuel was used.

The results of Examples 3a and 3b are listed in the following table:

|  | Example 3a | Example 3b |
|---|---|---|
| Release force [g/cm²] | 876–937 | no release |
| Discoloration of AB 2 | none |  |

Even under high temperature stress, the asphalt release agents of the invention exhibit an outstanding release action with respect to high-viscosity polymer-modified colored asphalt binder which can be used for water permeable colored asphalts. Diesel fuels are unsuitable under these conditions as release agents for these asphalt binders. The asphalt release agents of the invention induce no discoloration whatsoever of high-viscosity polymer-modified colored asphalt binders.

Example 4a

AB 1 was melted at 170° C., and twice the amount of an asphalt release agent, comprising 10% by weight of a water soluble polyether-functional organopolysiloxane of formula B, of viscosity 800 mm²/s, and 90% by weight of water, was immediately poured over it. The mixture was subsequently cooled to room temperature. After a standing time of one week the supernatant liquid phase was colorless. The asphalt release agent did not dissolve the asphalt binder.

Example 4b

AB 1 was melted at 170° C., and twice the amount of an asphalt release agent, comprising 5% by weight of a water soluble polyglucoside-functional organopoly-siloxane of formula D, which is solid at room temperature and contains glucose units as glucoside unit, and 95% by weight of water, was immediately poured over it. The mixture was subsequently cooled to room temperature. After a standing time of one week the supernatant liquid phase was colorless. The asphalt release agent did not dissolve the asphalt binder.

Example 4c

AB 2 was melted at 170° C., and twice the amount of an asphalt release agent, comprising 10% by weight of a water soluble polyether-functional organopolysiloxane of formula B, of viscosity 800 mm²/s, and 90% by weight of water, was immediately poured over it. The mixture was subsequently cooled to room temperature. After a standing time of one week the supernatant liquid phase was colorless. The asphalt release agent did not dissolve the asphalt binder.

Example 4d

AB 2 was melted at 170° C., and twice the amount of an asphalt release agent, comprising 5% by weight of a water soluble polyglucoside-functional organopoly-siloxane of formula D, which is solid at room temperature and contains glucose units as glucoside unit, and 95% by weight of water, was immediately poured over it. The mixture was subsequently cooled to room temperature. After a standing time of one week the supernatant liquid phase was colorless. The asphalt release agent did not dissolve the asphalt binder.

Example 5

On Feb. 27, 1999 an asphalt release agent, comprising 20% by weight of a water soluble polyether-functional organopolysiloxane of formula B of viscosity 800 mm²/s, and 80% by weight of water, was subjected to a field test. 5 liters of the asphalt release agent were applied uniformly using a conventional manual sprayer to the platform of a truck which was subsequently loaded with high-viscosity polymer-modified colored asphalt at a temperature of 175° C. Following the transportation and unloading of the asphalt, which took about 1 hour, the bed of the truck was assessed. No asphalt residuum whatsoever was observed on the bed. In addition, the asphalt was assessed. No discoloration whatsoever was found on the asphalt. The ambient temperature during the field trial was approximately 3° C.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for treating a substrate to facilitate release of a subsequently applied asphaltic composition which would tend to adhere to the substrate in the absence of a release coating, said process comprising the step of applying a release coating composition to a substrate, wherein the release coating composition displays release properties with respect to asphalts and comprises at least one polyorganosiloxane in an aqueous solution, wherein said polyorganosiloxane is a self-dispersing organopolysiloxane which is self-dispersing in water without the use of additional dispersants.

2. The process of claim 1, wherein the self-dispersing polyorganosiloxane is a polyethersiloxane.

3. The process of claim 1, wherein the self-dispersing polyorganosiloxane is a polyglycosidesiloxane.

4. The process as claimed in claim 1, wherein at least one self-dispersing polyorganosiloxane, polyethersiloxane, or polyglycosidesiloxane is present in water in a ratio of from 1:0.001 to 1:100,000.

5. A process for producing a coating which repels bituminous substances or mixtures of substances or substances containing coal tar pitch, which comprises applying an aqueous release composition to a substrate, wherein said composition comprises a polyglycoside-functional organopolysiloxane containing glycoside radicals, comprising units of the formula $$R^8_f R^9_g SiO_{(4-f-g)/2} \quad (I)$$

in which

R$^9$ is identical or different and is a radical of the formula $$W-(R^{10}O)_h-R^{11}-$$

in which

W is a glycoside radical, which is composed of preferably up to 10 monosaccharide units, R$^8$ is an optionally substituted C$_{1-18}$ hydrocarbon radical, R$^{10}$ is identical or different and is an alkylene radical, f is 0, 1, 2, or 3, g is 0, 1, 2, or 3, h is 0 or a number from 1 to 20, and R$^{11}$ is alkylene radical, with the proviso that the sum of f and g is less than or equal to 3 and the organosilicon compound, composed of units of formula (I), includes at least one radical R$^9$ per molecule.

6. The process of claim 5, wherein said composition comprises a weight ratio of organopolysiloxane to water of 1:0.001 to 1:100,000.

7. The process of claim 5, wherein said substrate is a metal substrate.

8. A process for producing a coating which repels bituminous substances or mixtures of substances or substances containing coal tar pitch, which comprises applying an aqueous release composition to a substrate, wherein said composition comprises a polyglycoside-functional organopolysiloxane containing glycoside radicals, comprising units of the formula $$R^8_f R^9_g SiO_{(4-f-g)/2} \quad (I)$$

in which

R$^9$ is identical or different and is a radical of the formula $$W-(R^{10}O)_h-R^{11}-$$

in which

W is a glycoside radical, which is composed of preferably up to 10 monosaccharide units, R$^8$ is an optionally substituted C$_{1-18}$ hydrocarbon radical, R$^{10}$ is identical or different and is an alkylene radical, f is 0, 1, 2, or 3, g is 0, 1, 2, or 3, h is 0 or a number from 1 to 4, and R$^{11}$ is alkylene radical, with the proviso that the sum of f and g is less than or equal to 3 and the organosilicon compound, composed of units of formula (I), includes at least one radical R$^9$ per molecule.

9. An aqueous release composition comprising an organopolysiloxane which is water soluble or forms a stable aqueous emulsion or aqueous dispersion without the addition of a separate surfactant, emulsifier, or dispersing aid, said organopolysiloxane being present in a weight ratio of organopolysiloxane to water of 1:0.001 to 1:100,000, and comprising one or more of:

a) polyoxyalkylene-functional organopolysiloxanes of the formula:

$$YR^3_2SiO-[SiR^3_2O-]_a[SiR^3ZO-]_bSiR^3_2Y$$

where

Y is the radical R$^3$ or the radical Z,

R$^3$ is an alkyl radical of 1 to 60 carbon atoms, a substituted alkyl radical, an unsubstituted or substituted aryl radical or unsubstituted or substituted alkaryl radical, but where at least 80% of the radicals R$^3$ are methyl groups, Z is a radical of the formula $$-R^4_c-O-(C_dH_{2d-e}R^5_eO-)_mR^6$$

where

R$^4$ is a divalent alkylene radical, which can also be branched, c has a value of 0 or 1, d has a value from 2 to 4, e has a value from 0 to 3, m has a value from 1 to 100 and the expression surrounded by the bracket with the index m can be identical or different and can be arranged in blocks or in random distribution, R$^5$ is a monovalent organic radical which is optionally branched and which optionally contains oxyalkylene groups, R$^6$ is a hydrogen radical, and unsubstituted or substituted alkyl radical of 1 to 6 carbon atoms, an acyl radical or a radical —O—CO—NH—R$^7$ in which R$^7$ is an unsubstituted or substituted alkyl or aryl radical, where at least one radical Z must be present on average per molecule, optionally in the form of the radical Y, a has a value from 0 to 500 and b has a value from 0 to 100, or b) a polyglycoside-functional organopolysiloxane containing glycoside radicals, comprising units of the formula $$R^8_f R^9_g SiO_{(4-f-g)/2} \quad (I)$$

in which

R$^9$ is identical or different and is a radical of the formula $$W-(R^{10}O)_h-R^{11}-$$

in which

W is a glycoside radical, which is composed of preferably up to 10 monosaccharide units, R$^8$ is an optionally substituted C$_{1-18}$ hydrocarbon radical, R$^{10}$ is identical or different and is an alkylene radical, f is 0, 1, 2, or 3, g is 0, 1, 2, or 3, h is 0 or a number from 1 to 20, and R$^{11}$ is alkylene radical, with the proviso that the sum of f and g is less than or equal to 3 and the organosilicon compound, composed of units of formula (I), includes at least one radical R$^9$ per molecule, said aqueous release composition further comprising at least one surfactant, emulsifier, or dispersing aid.

10. An aqueous release composition comprising an organopolysiloxane which is water soluble or forms a stable aqueous emulsion or aqueous dispersion without the addition of a separate surfactant, emulsifier, or dispersing aid, said organopolysiloxane being present in a weight ratio of organopolysiloxane to water of 1:0.001 to 1:100,000, and comprising one or more of:

a) polyoxyalkylene-functional organopolysiloxanes of the formula:

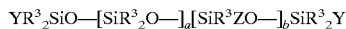

where
Y is the radical $R^3$ or the radical Z,
$R^3$ is an alkyl radical of 1 to 60 carbon atoms, a substituted alkyl radical, an unsubstituted or substituted aryl radical or unsubstituted or substituted alkaryl radical, but where at least 80% of the radicals $R^3$ are methyl groups,
Z is a radical of the formula

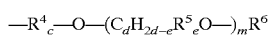

where
$R^4$ is a divalent alkylene radical, which can also be branched,
c has a value of 0 or 1,
d has a value from 2 to 4,
e has a value from 0 to 3,
m has a value from 1 to 100 and the expression surrounded by the bracket with the index m can be identical or different and can be arranged in blocks or in random distribution,
$R^5$ is a monovalent organic radical which is optionally branched and which optionally contains oxyalkylene groups,
$R^6$ is a hydrogen radical, and unsubstituted or substituted alkyl radical of 1 to 6 carbon atoms, an acyl radical or a radical —O—CO—NH—$R^7$ in which $R^7$ is an unsubstituted or substituted alkyl or aryl radical,
where
at least one radical Z must be present on average per molecule, optionally in the form of the radical Y,
a has a value from 0 to 500 and
b has a value from 0 to 100, or
b) a polyglycoside-functional organopolysiloxane containing glycoside radicals, comprising units of the formula

 (I)

in which
$R^9$ is identical or different and is a radical of the formula

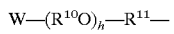

in which
W is a glycoside radical, which is composed of preferably up to 10 monosaccharide units,
$R^8$ is an optionally substituted $C_{1-18}$ hydrocarbon radical,
$R^{10}$ is identical or different and is an alkylene radical,
f is 0, 1, 2, or 3,
g is 0, 1, 2, or 3,
h is 0 or a number from 1 to 20, and
$R^{11}$ is alkylene radical, with the proviso that the sum of f and g is less than or equal to 3 and the organosilicon compound, composed of units of formula (I), includes at least one radical $R^9$ per molecule,
said aqueous release composition further comprising at least one animal or vegetable oil in an amount from 0 up to 10 weight percent, based on the weight of said release composition.

11. A process for the handling of asphalt materials, said process comprising:

a) providing a substrate to be contacted with asphalt material;
b) prior to contact with said asphalt material, applying to said substrate an aqueous release composition to form a release-coated substrate;
c) contacting said release-coated substrate with asphalt material, wherein said aqueous release composition comprises an organopolysiloxane which is water soluble or forms a stable aqueous emulsion or aqueous dispersion without the addition of a separate surfactant, emulsifier, or dispersing aid, said organopolysiloxane being present in a weight ratio of organopolysiloxane to water of 1:001 to 1:1,000,000, and comprising one or more of:

a) polyoxyalkylene-functional organopolysiloxanes of the formula:

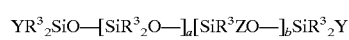

where
Y is the radical $R^3$ or the radical Z,
$R^3$ is an alkyl radical of 1 to 60 carbon atoms, a substituted alkyl radical, an unsubstituted or substituted aryl radical or unsubstituted or substituted alkaryl radical, but where at least 80% of the radicals $R^3$ are methyl groups,
Z is a radical of the formula

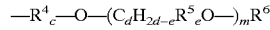

where
$R^4$ is a divalent alkylene radical, which can also be branched,
c has a value of 0 or 1,
d has a value from 2 to 4,
e has a value from 0 to 3,
m has a value from 1 to 100 and the expression surrounded by the bracket with the index m can be identical or different and can be arranged in blocks or in random distribution,
$R^5$ is a monovalent organic radical which is optionally branched and which optionally contains oxyalkylene groups,
$R^6$ is a hydrogen radical, and unsubstituted or substituted alkyl radical of 1 to 6 carbon atoms, an acyl radical or a radical —O—CO—NH—$R^7$ in which $R^7$ is an unsubstituted or substituted alkyl or aryl radical,
where
at least one radical Z must be present on average per molecule, optionally in the form of the radical Y,
a has a value from 0 to 500 and
b has a value from 0 to 100, or
b) a polyglycoside-functional organopolysiloxane containing glycoside radicals, comprising units of the formula

 (I)

in which

R$^9$ is identical or different and is a radical of the formula $$W-(R^{10}O)_h-R^{11}-$$

in which
W is a glycoside radical, which is composed of preferably up to 10 monosaccharide units,
R$^8$ is an optionally substituted C$_{1-18}$ hydrocarbon radical,
R$^{10}$ is identical or different and is an alkylene radical,
f is 0, 1, 2, or 3,
g is 0, 1, 2, or 3,
h is 0 or a number from 1 to 20, and
R$^{11}$ is alkylene radical,
with the proviso that the sum of f and g is less than or equal to 3 and the organosilicon compound, composed of units of formula (I), includes at least one radical R$^9$ per molecule.

12. A process for treating a substrate to facilitate release of a subsequently applied asphaltic composition which would tend to adhere to the substrate in the absence of a release coating, said process comprising the step of applying a release coating composition to a substrate, wherein the release coating composition displays release properties with respect to asphalts and comprises at least one organopolysiloxane in an aqueous solution, wherein said organopolysiloxane is self-dispersing in water without the use of additional dispersants, and comprises at least one of:

a) polyoxyalkylene-functional organopolysiloxanes of the formula:

$$YR^3_2SiO-[SiR^3_2O-]_a[SiR^3ZO-]_bSiR^3_2Y$$

where
Y is the radical R$^3$ or the radical Z,
R$^3$ is an alkyl radical of 1 to 60 carbon atoms, a substituted alkyl radical, an unsubstituted or substituted aryl radical or unsubstituted or substituted alkaryl radical, but where at least 80% of the radicals R$^3$ are methyl groups,
Z is a radical of the formula $$-R^4_c-O-(C_dH_{2d-e}R^5_eO-)_mR^6$$

where
R$^4$ is a divalent alkylene radical, which can also be branched,
c has a value of 0 or 1,
d has a value from 2 to 4,
e has a value from 0 to 3,
m has a value from 1 to 100 and the expression surrounded by the bracket with the index m can be identical or different and can be arranged in blocks or in random distribution,
R$^5$ is a monovalent organic radical which is optionally branched and which optionally contains oxyalkylene groups,
R$^6$ is a hydrogen radical, and unsubstituted or substituted alkyl radical of 1 to 6 carbon atoms, an acyl radical or a radical —O—CO—NH—R$^7$ in which R$^7$ is an unsubstituted or substituted alkyl or aryl radical,
where
at least one radical Z must be present on average per molecule, optionally in the form of the radical Y,
a has a value from 0 to 500 and
b has a value from 0 to 100, or b) a polyglycoside-functional organopolysiloxane containing glycoside radicals, comprising units of the formula $$R^8_fR^9_gSiO_{(4-f-g)/2} \qquad (I)$$

in which
R$^9$ is identical or different and is a radical of the formula $$W-(R^{10}O)_h-R^{11}-$$

in which
W is a glycoside radical, which is composed of preferably up to 10 monosaccharide units,
R$^8$ is an optionally substituted C$_{1-18}$ hydrocarbon radical,
R$^{10}$ is identical or different and is an alkylene radical,
f is 0, 1, 2, or 3,
g is 0, 1, 2, or 3,
h is 0 or a number from 1 to 20, and
R$^{11}$ is alkylene radical,
with the proviso that the sum of f and g is less than or equal to 3 and the organosilicon compound, composed of units of formula (I), includes at least one radical R$^9$ per molecule.

13. The process of claim 12 wherein a three layer system is created, said system comprising
a first substrate layer; a second layer comprising said at least one self-dispersing polyorganosiloxane; and a third layer comprising a hot composition containing at least one bituminous substance or a mixture of substances containing coal tar pitch.

14. The process of claim 13 wherein said first substrate layer comprises a metal surface and said third layer comprises a road paving asphalt.

* * * * *